United States Patent

[11] 3,620,321

| | | |
|---|---|---|
| [72] | Inventor | John L. Thibodeau<br>Tampa, Fla. |
| [21] | Appl. No. | 811,728 |
| [22] | Filed | Apr. 1, 1969 |
| [45] | Patented | Nov. 16, 1971 |
| [73] | Assignee | Standard Alliance Industries, Inc.<br>Chicago, Ill. |

[54] TRACTOR DRIVE CONVERSION
3 Claims, 25 Drawing Figs.

[52] U.S. Cl. ................................................ 180/46,
180/41, 180/79.2 B
[51] Int. Cl. ................................................ B60k 17/30,
B60k 17/34
[50] Field of Search ................................. 180/45, 46,
49, 41, 23, 24, 79.2 B

[56] References Cited

UNITED STATES PATENTS

| 3,161,172 | 12/1964 | Kassbohrer .................... | 180/24 X |
| 3,351,037 | 11/1967 | Meili ............................. | 180/23 X |
| 3,414,072 | 12/1968 | Hodges, Jr. et al. ............ | 180/24 X |

FOREIGN PATENTS

| 770,667 | 3/1957 | Great Britain ................. | 180/45 |
| 852,617 | 10/1960 | Great Britain ................. | 180/41 |
| 174,279 | 2/1961 | Sweden ........................ | 180/41 |

*Primary Examiner*—A. Harry Levy
*Attorney*—Hume, Clement, Hume & Lee

ABSTRACT: There is disclosed a means to convert a conventional two wheel drive tractor to four wheel drive utilizing the original tractor power unit, the transmission-differential and the frame comprising two walking beam frame assemblies connected to the original rear drive axle, each housing a sprocket for a front wheel, a sprocket for a rear wheel, a means to drive these wheels, and a chain to take the power from the drive means and transfer it to the wheel sprockets. The drive sprocket is connected to the tractor rear axle transmission-differential on each side of the tractor so that the power from the tractor is transmitted to the front and rear wheel sprockets by the continuous chain. A ball joint is added to each wheel which is connected to the wheel sprocket in the frame, a hydraulic cylinder is connected to each ball joint with a steering arm allowing the wheel to be steered hydraulically. A vertical hydraulic cylinder is connected to a yoke which extends over the hood of the tractor allowing the power unit to be raised or lowered hydraulically without affecting the plane of the four wheels of the tractor and acting as an oscillator on the front wheels.

Inventor
John L. Thibodeau
By Hume, Clement, Hume & Lee
Attorneys

Inventor
John L. Thibodeau
By Hume, Clement, Hume&Lee
Attorneys

Inventor
John L. Thibodeau
By Hume, Clement, Hume & Lee
Attorney

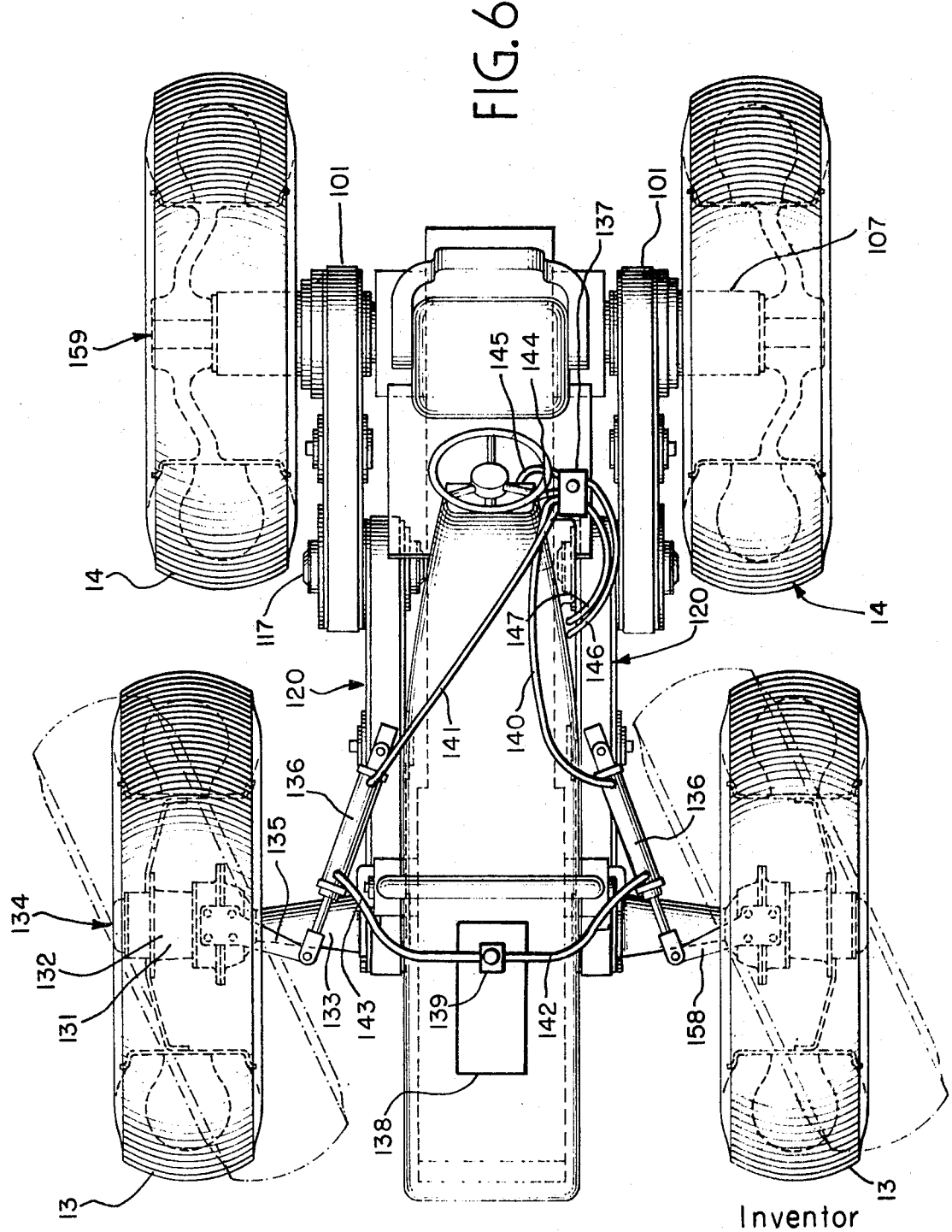

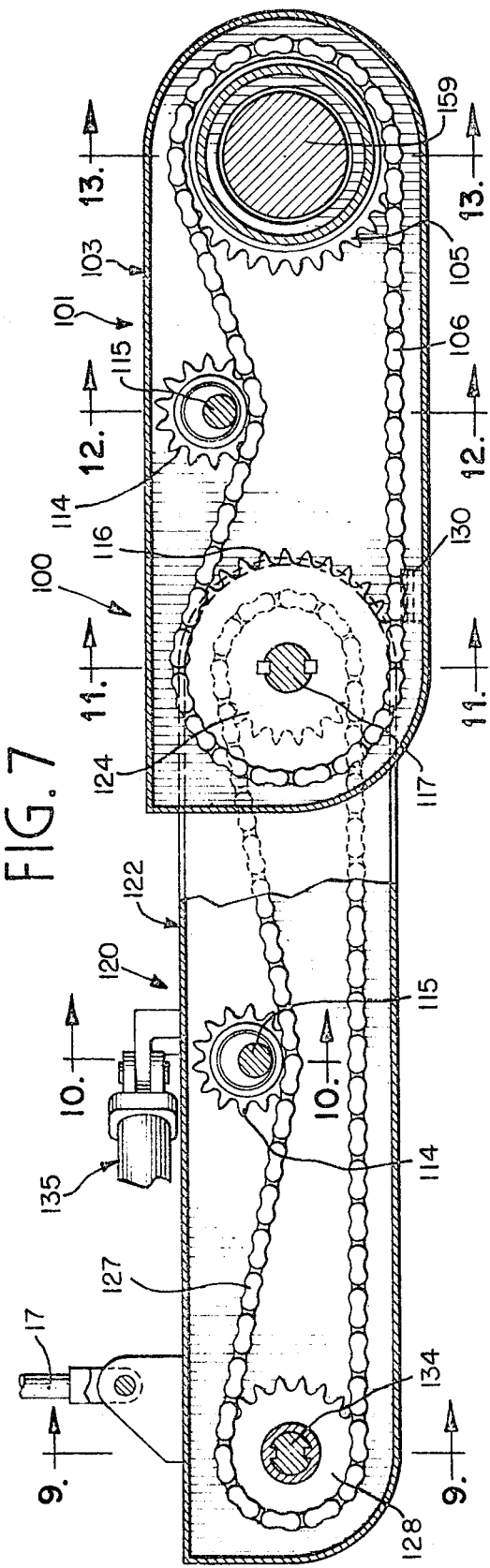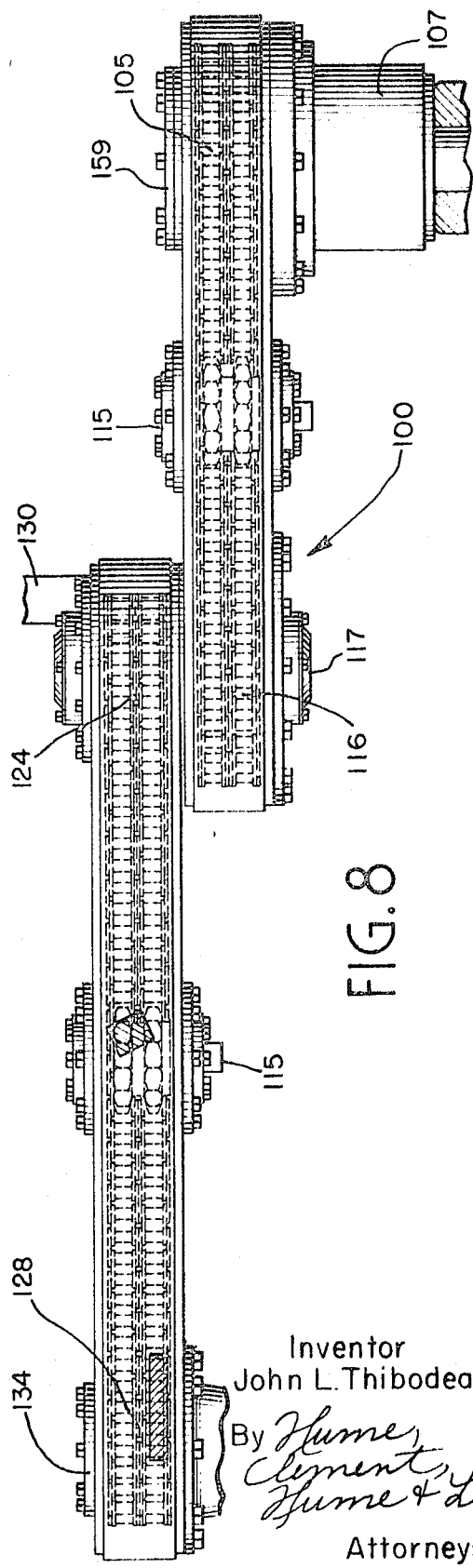

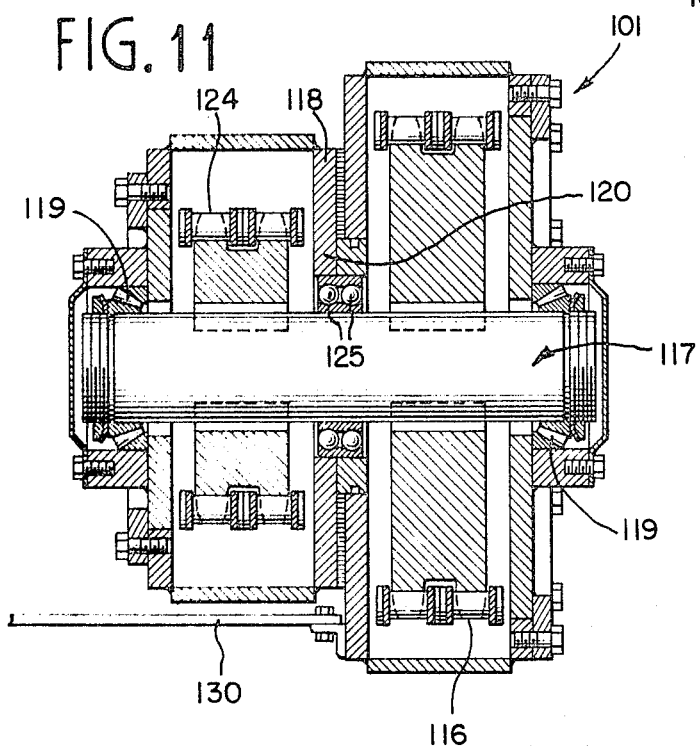
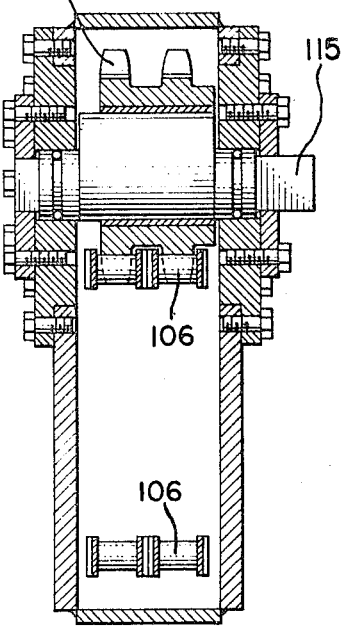
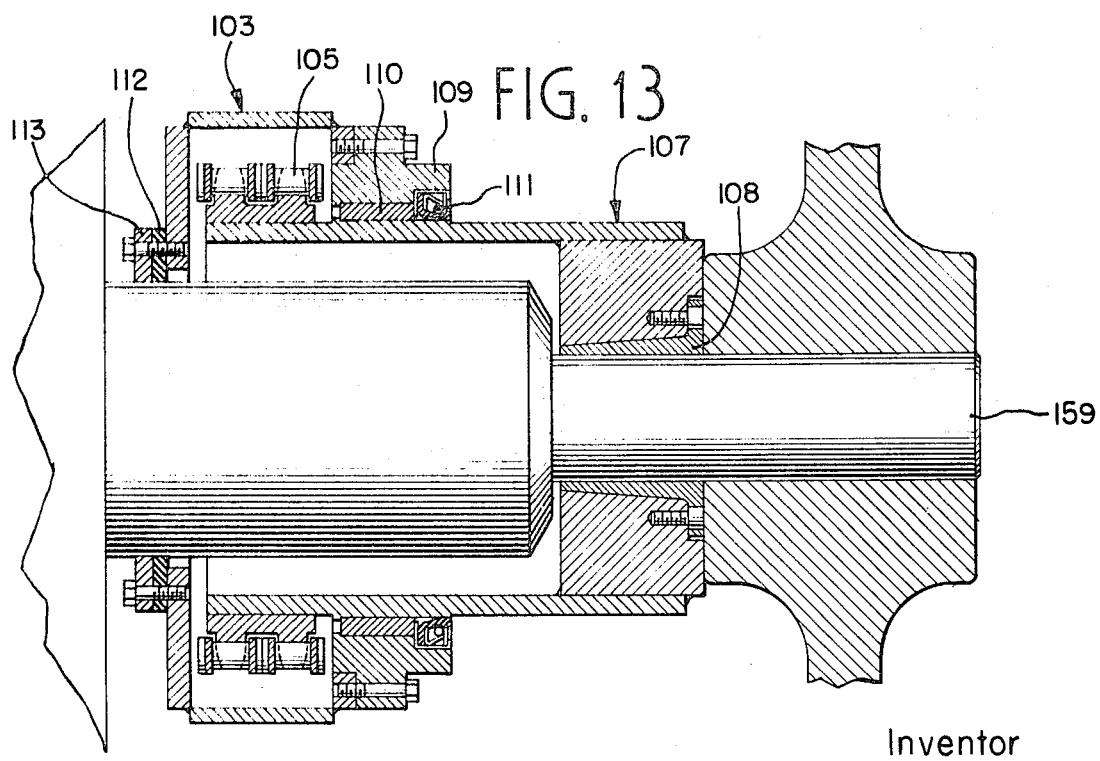

Inventor
John L. Thibodeau
By Hume, Clement, Hume & Lee
Attorneys

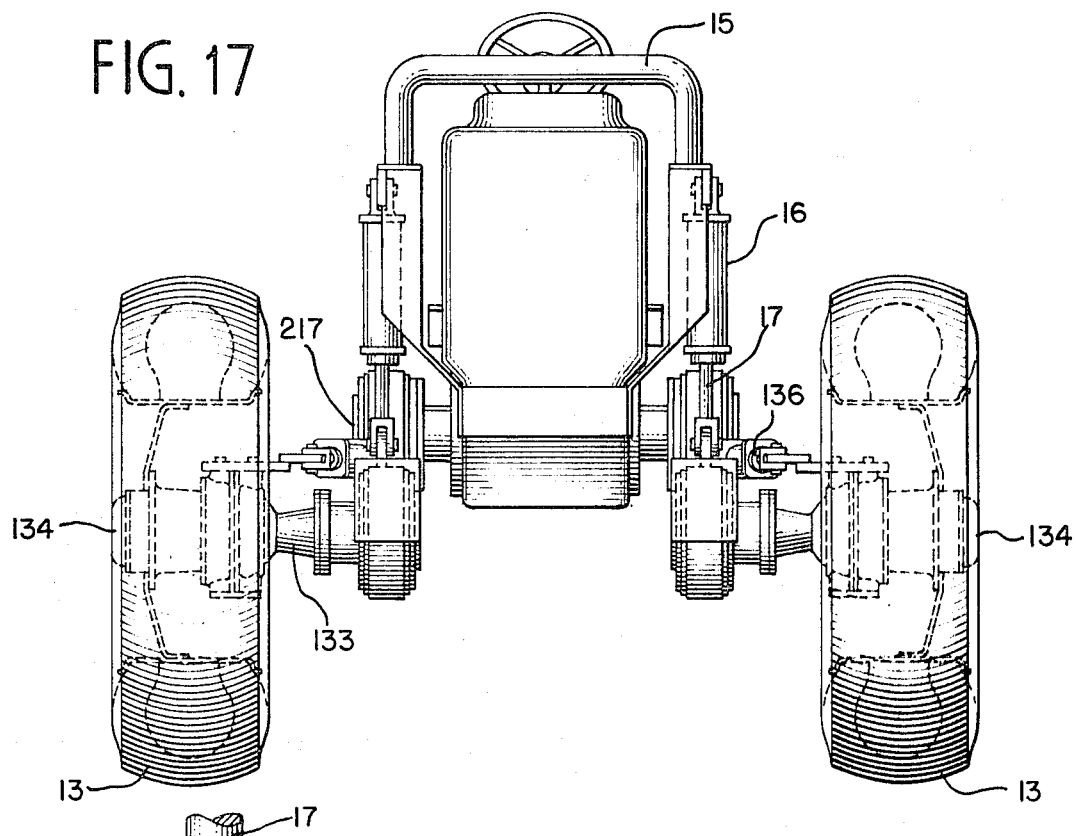
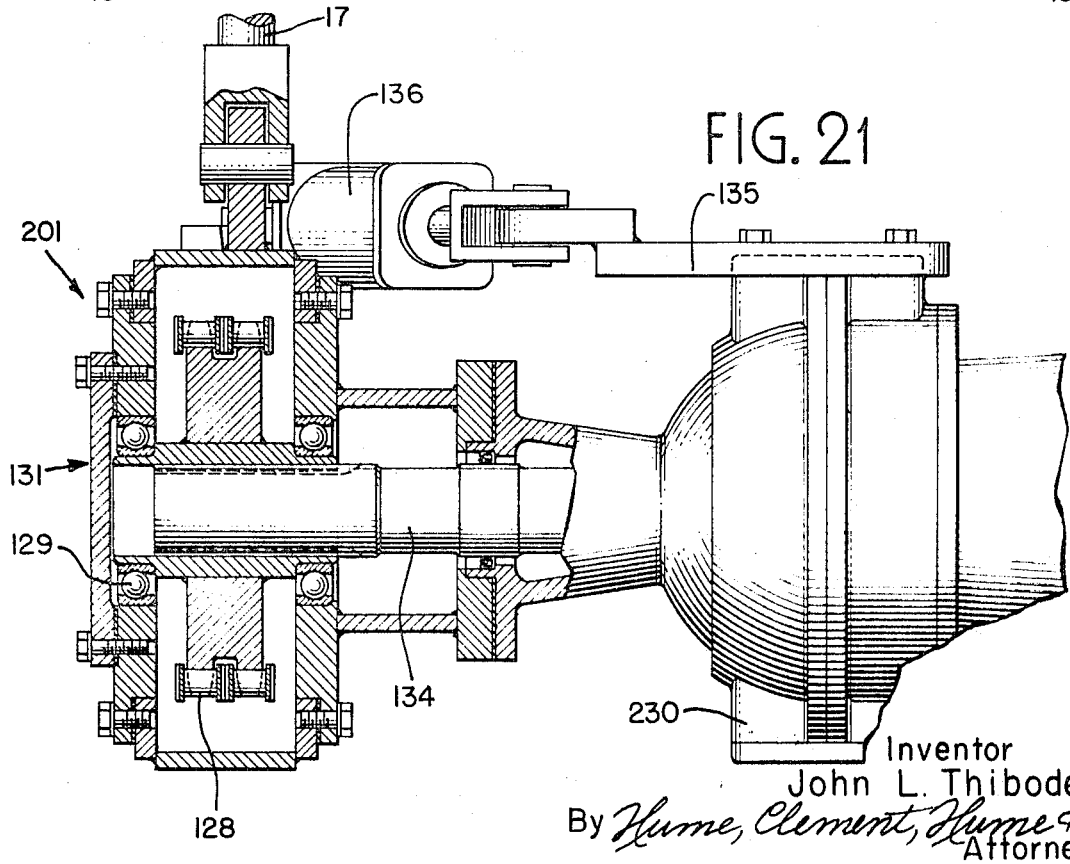

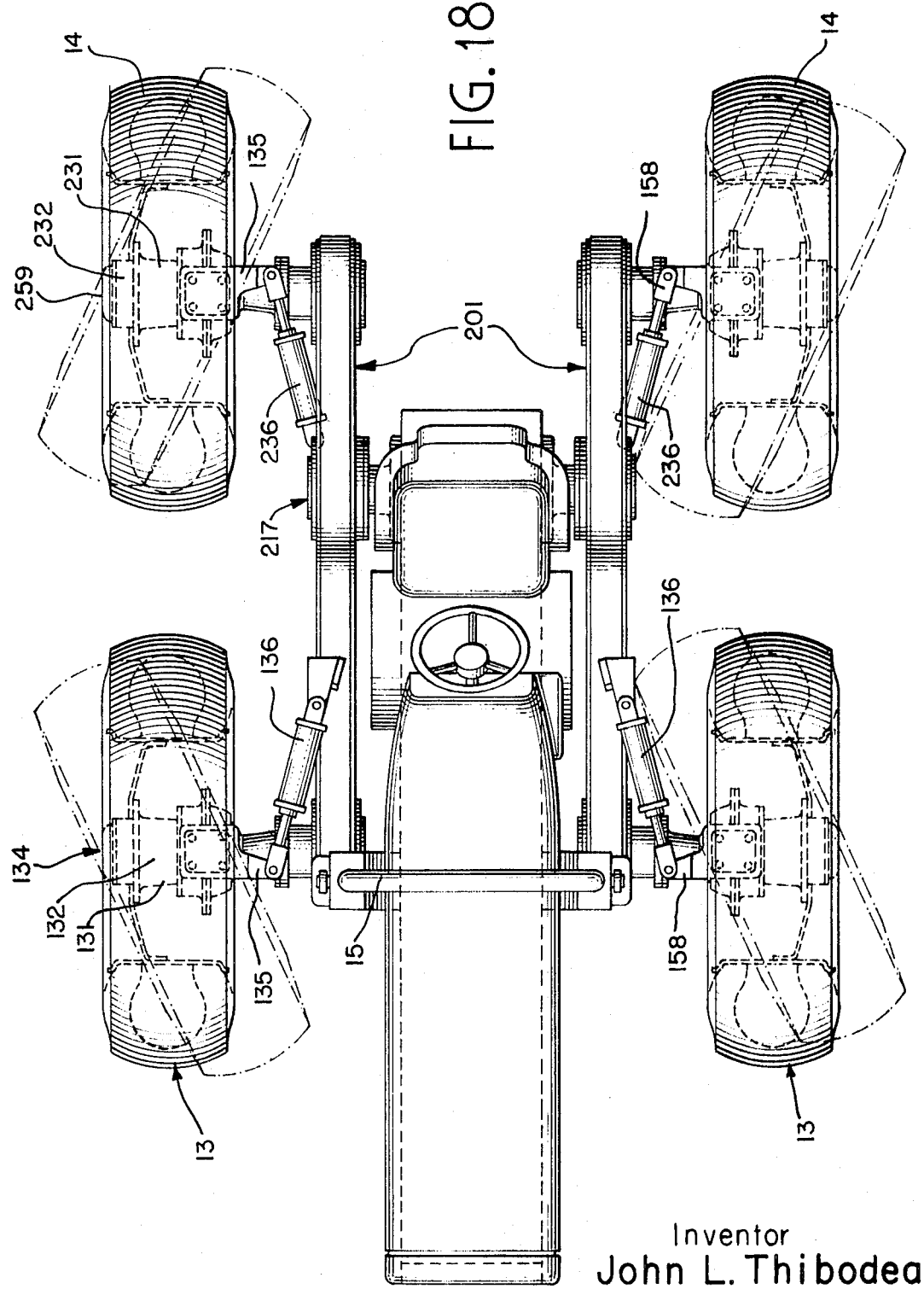

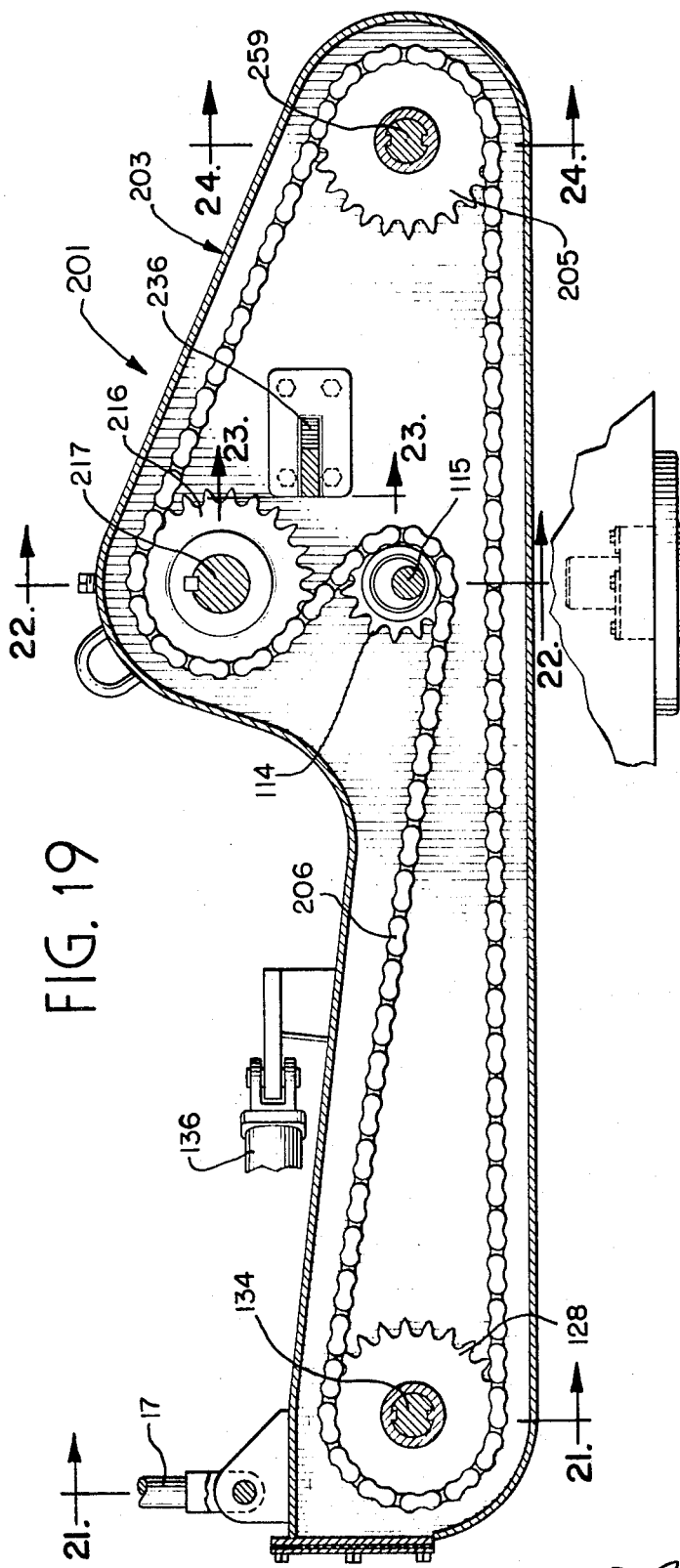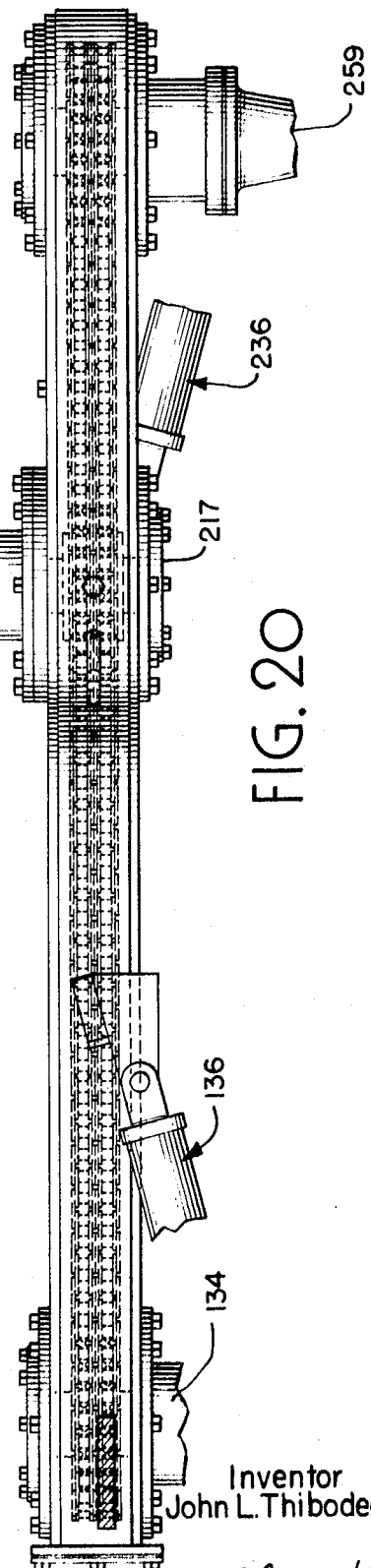

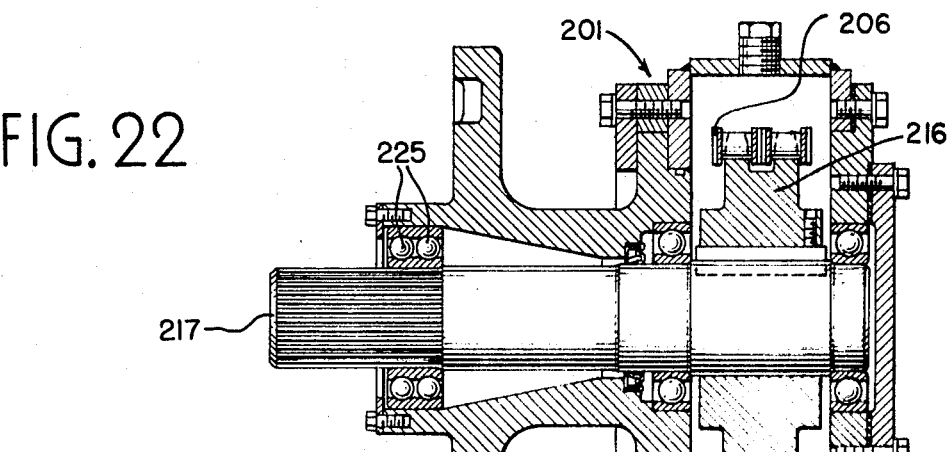
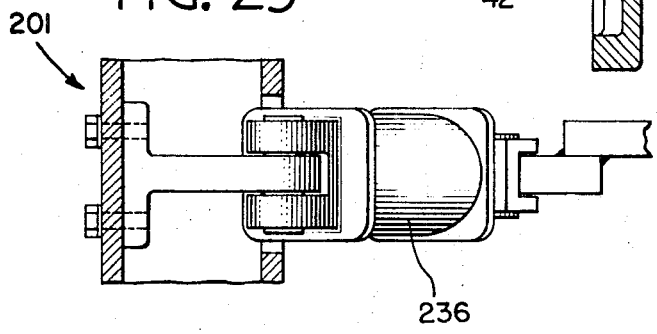
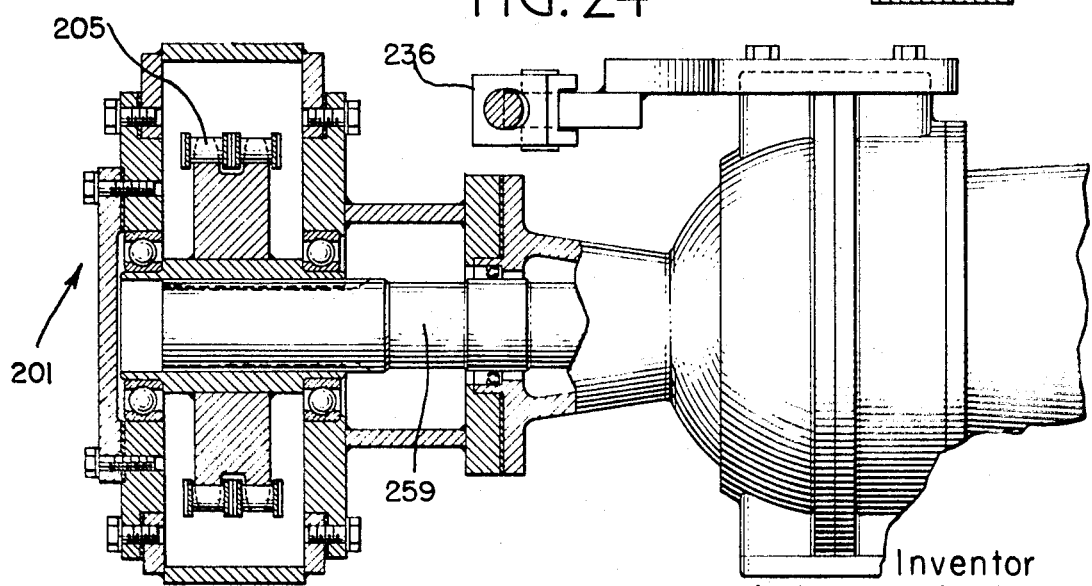

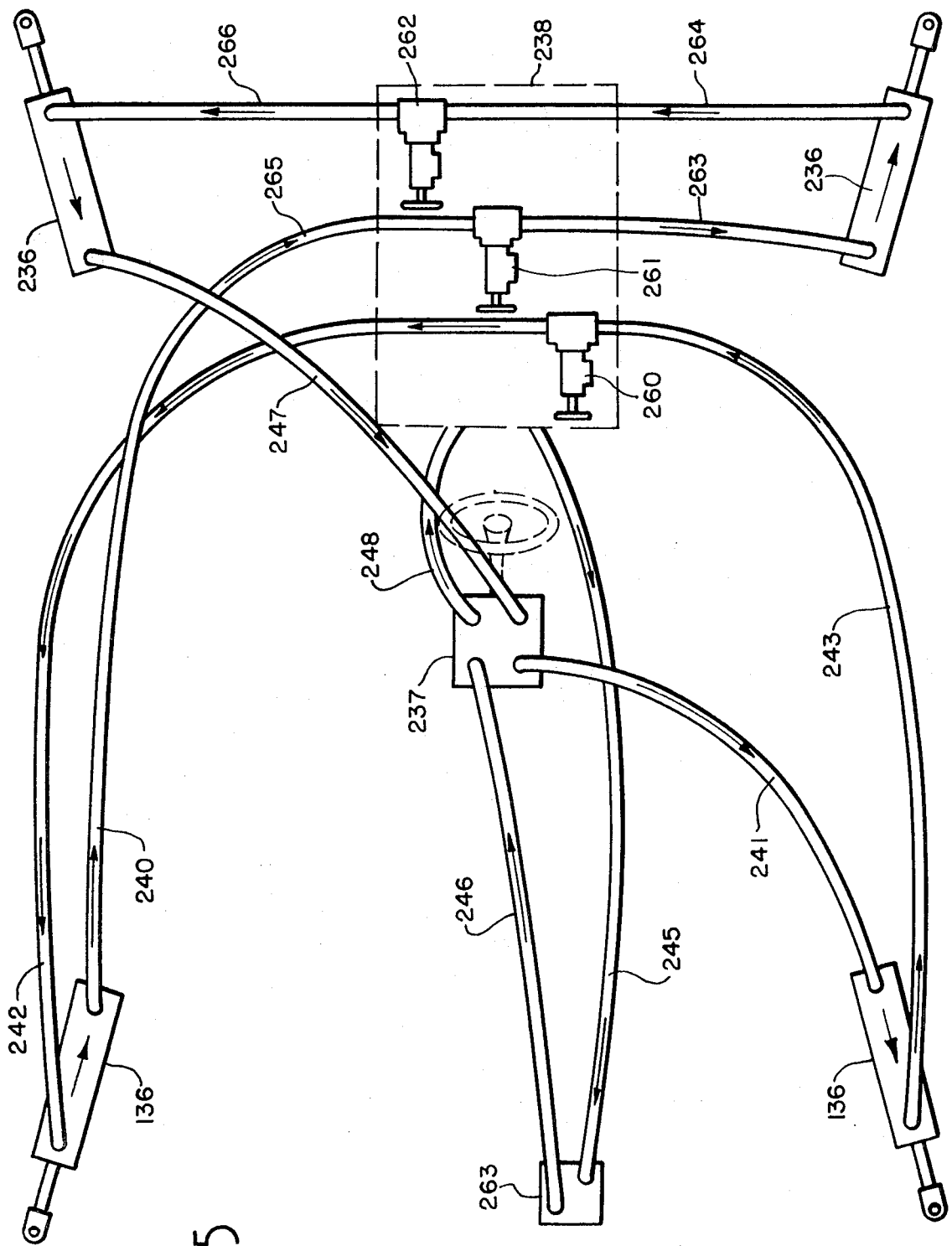

TRACTOR DRIVE CONVERSION

FIELD OF THE INVENTION

This invention relates to land vehicles and more particularly to a tractor that is particularly adapted for movement over rough terrain and marshlands and which can from the basic power unit for a logging machine that is capable of sheering, delimbing, skidding, and bucking logs.

DESCRIPTION OF THE PRIOR ART

The present invention is an improvement over my U.S. Pat. No. 2,901,051, entitled "Tractor Drive in Suspension Mechanism." In the land vehicle field it has been the general practice to employ separate machines for sheering, delimbing, skidding, and bucking of logs. Heretofore tractors have been unsuitable as a power source for these machines in that considerable difficulty has been experienced in the movement of the tractor over rough terrain. In my prior patent above, I have attempted to provide a tractor conversion unit which enables a tractor to operate under adverse ground conditions. However, this conversion has proved unsatisfactory due to the high cost of conversion, the elaborate linkage system required, and the difficulty in steering and stability due to the rigid fastening of the wheels to the frame.

SUMMARY OF THE INVENTION

The general purpose of this invention is to provide a tractor conversion unit which embraces all the advantages of similarly employed devices and possesses none of the aforedescribed disadvantages. To attain this, the present invention contemplates a unique arrangement whereby a conventional farm tractor is modified so as to utilize the original power unit, transmission-differential as well as the original frame of the tractor. A walking beam frame assembly is attached to each side of the tractor. Each assembly houses a sprocket for a front wheel, a sprocket for a rear wheel, a sprocket to drive these wheels, and a chain to take the power from the drive sprocket and transfer it to the front and rear wheel sprockets. The drive sprocket is connected to the rear axle of the tractor transmission-differential on each side so that the power from the tractor is transmitted to a pivot sprocket and then transmitted to the front wheel sprockets by a continuous chain. At each wheel, a ball joint is added which is connected to the wheel sprocket on the frame and gets its power from the source. Attached to each ball joint is a hydraulic cylinder with a steering arm allowing each wheel to be steered hydraulically. In a first disclosed embodiment only the front wheels are steerable and in a second disclosed embodiment, all four wheels are steerable. Next, four large wheels with high flotation tires are added. At the front of the walking beam assembly on each side of the tractor there is attached a vertical hydraulic cylinder and connected to it is a yoke which extends over the hood of the tractor frame, allowing the power unit to be released or lowered hydraulically without affecting the plane of the four wheels and acting as an oscillator on the front wheels.

Therefore an object of the present invention is to provide a kit which can be readily attached to any conventional tractor thereby converting it from a two-wheel to a four-wheel drive.

Another object is to provide a kit to convert a tractor into a "crawler."

A further object of the invention is the conversion of a tractor to allow for the change of the center of gravity of the unit horizontally by which the front axle can be loaded or unloaded.

Still another object is to provide a tractor conversion kit which can be as easily removed as installed thereby allowing the tractor to be returned to its original condition.

Yet another object of the present invention is the provision of a tractor which is capable of agricultural uses because of greatly increased traction, pulling and hauling ability and maneuverability with lesser horsepower requirements.

A still further object of the present invention is to provide a tractor which eliminates soil compaction and is low in cost to produce.

A further object of the invention is the provision of a tractor which can be driven over rough terrain and which permits one wheel to ride higher or lower than the other and still keeps the tractor level with all four wheels touching the ground.

Another and still further object is to provide a tractor in which there is a simple hand switch power-steering control to permit a minimum turning radius and which will enable an operator to work continuously over rough and rugged terrain with a minimum of manual effort required in steering the tractor.

A still further object of this invention is to provide a tractor in which the original front wheels of the tractor may be lowered so as to operate as a conventional tractor unit.

Other objects and many of the attendant advantages of this invention will be readily appreciated as the same becomes better understood by reference to the following detailed description when considered in connection with the accompanying drawings in which reference numerals designate like parts throughout the figures thereof.

BRIEF DESCRIPTION OF THE DRAWINGS

FIG. 6 shows a top view of the tractor shown in FIG. 1 including the hydraulic steering system.

FIG. 7 is an exploded diagrammatic view of the split beam shown in FIG. 1.

FIG. 8 is a top view of the split beam shown in FIG. 7.

FIG. 11 shows an enlarged view of the pivot drive sprocket mechanism taken on the line 11–11 of FIG. 7 looking in the direction of the arrows.

FIG. 12 shows an enlarged view of a second idler sprocket housing taken on the line 12–12 of FIG. 7 looking in the direction of the arrows.

FIG. 13 illustrates the rear wheel housing unit taken on the line 13–13 of FIG. 7 looking in the direction of the arrows.

FIG. 17 illustrates a front view of the apparatus shown in FIG. 14.

FIG. 18 shows a top elevation of the apparatus shown in FIG. 14. FIG. 19 illustrates the unitary walking beam assembly utilized in the device shown in FIG. 14.

FIG. 20 is a top view of the walking beam assembly shown in FIG. 19.

FIG. 21 illustrates an enlarged view of the front wheel assembly taken on the line 21–21 of FIG. 19 looking in the direction of the arrows.

FIG. 22 is an enlarged view of the power drive assembly taken on the line 22–22 of FIG. 19 looking in the direction of the arrows.

FIG. 23 illustrates an enlarged view of the rear wheel steering connection taken on the line 23–23 of FIG. 19 looking in the direction of the arrows.

FIG. 24 illustrates an enlarged view of the rear drive assembly taken on the line 24–24 of FIG. 19 looking in the direction of the arrows.

FIG. 25 is a diagrammatic view of the hydraulic steering system utilized in the device of FIG. 14.

DESCRIPTION OF THE PREFERRED EMBODIMENTS

Figure 1:
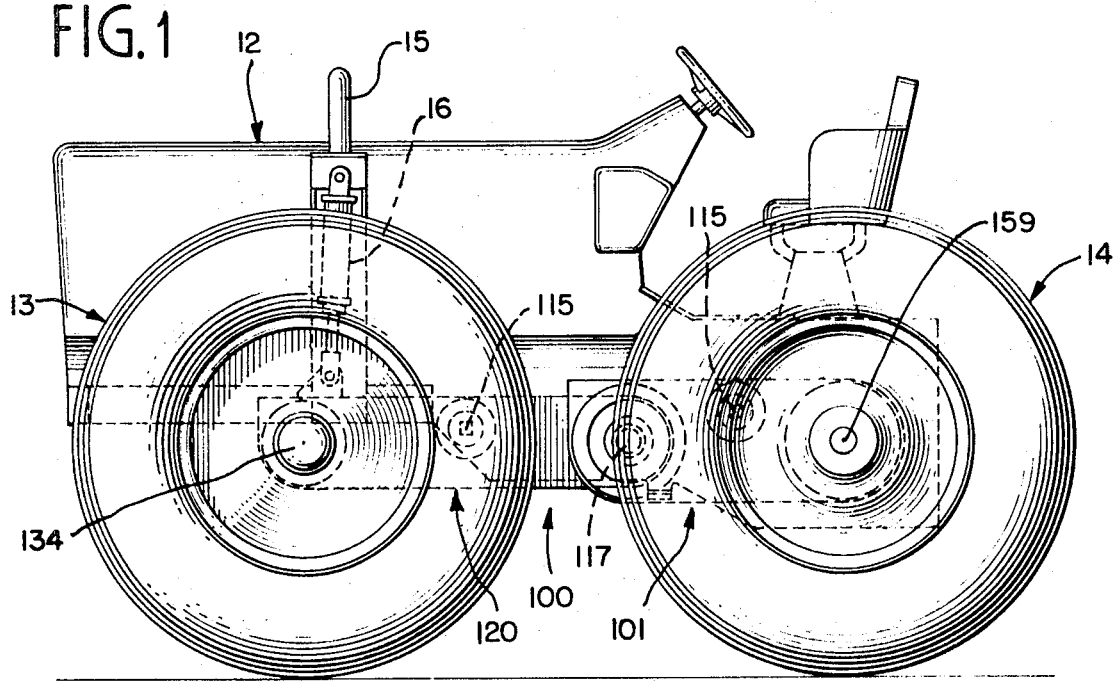
FIG. 1 shows a side view of a first preferred embodiment of the invention showing a two section beam assembly attached to a tractor.

Referring now to the drawings wherein like reference characters designate like or corresponding parts throughout the several views, there is shown in FIG. 1 which illustrates a first preferred embodiment, a conventional farm tractor body or frame 12 which has had its two large wheels at the rear and two small drive wheels at the front removed, thereby leaving the power unit, the body and the rear axle transmission-differential intact. A beam assembly 100 comprising two frame assemblies 101 and 120 is placed on either side of the tractor. Front beam assembly 120 contains a sprocket 128 for a front wheel having an axle 134. Rear beam assembly 101 is connected to rear drive axle 159 which is the original transmission axle of the tractor. The front sprockets receive their power from pivot drive sprockets 116 and 124 attached to pivot axle 117. The sprockets are connected together with drive chains 106 and 127 as shown in FIG. 7. The power from the tractor transmission causes rear sprocket 105 to rotate thereby causing pivot sprockets 116 and 124 to rotate and imparting motion to sprocket 128 through the continuous chains 106 and 127. At each front wheel, a ball joint is connected to the wheel sprocket and the frame. A hydraulic cylinder is attached to each ball joint with a steering arm and this allows each front wheel to be steered hydraulically (as explained below). Four large wheels 13 and 14 are added having high flotation tires. A vertical hydraulic cylinder 16 is connected to each end of a yoke 15 which extends over the hood of the tractor. This vertical cylinder allows the power unit to be raised or lowered hydraulically without affecting the plane of rotation of the four wheels and acts for oscillation of the front wheels.

Only a few simple handtools are required to remove the original front and rear wheels of the tractor and install the beams and their accessories. No drilling, tapping, welding, or riveting is required and the tractor itself is never altered in any fashion. Conversely, the beams are as easily removed as installed, and the tractor can be returned to its original condition by reinstating the previously removed equipment. The sprocket and chain mechanism, as will be explained below, is always engaged to the original rear axle transmission-differential; and as long as this axle is turning, the four wheels are being driven regardless of the direction that the tractor is moving. There are no clutches to slip or wear out, and no gear trains that require constant maintenance and that occasional overhaul. Utilizing hydraulic steering of the wheels while the wheels are being driven through the chain drive, provides for no loss of traction in pulling a load regardless of any turning radius. The use of the hydraulic steering cylinders further provides positive steering at all times, eliminating the use of tie rods and kingpins and the adjustments that would go with them.

Figure 2:
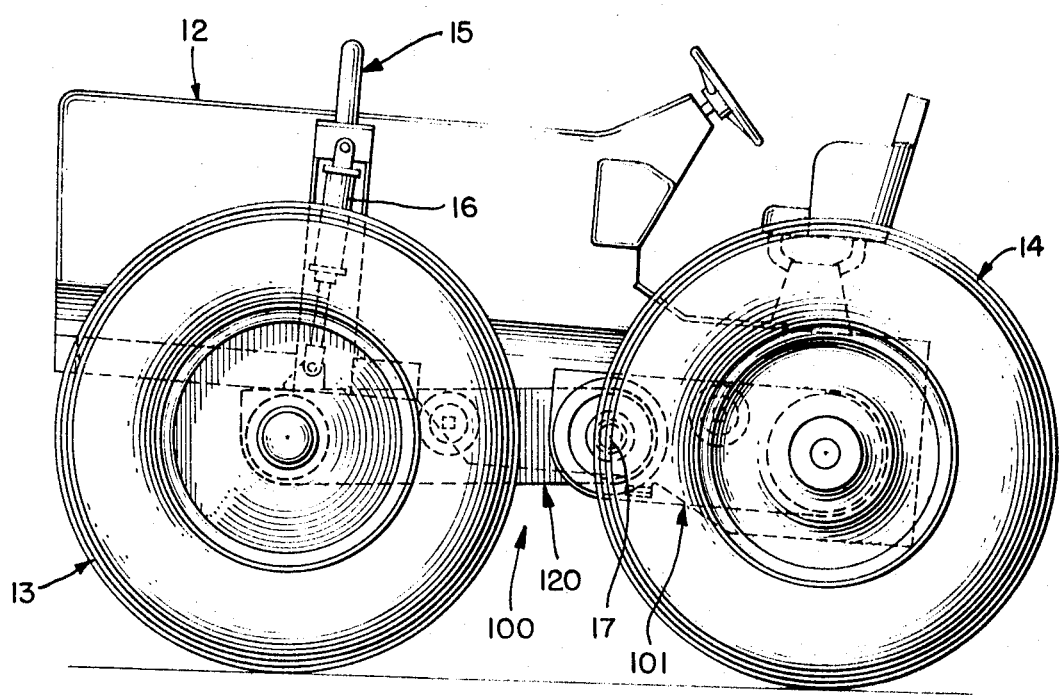
FIGS. 2 and 3 show the beam assembly of FIG. 1 in a second and third position.
Figure 3:
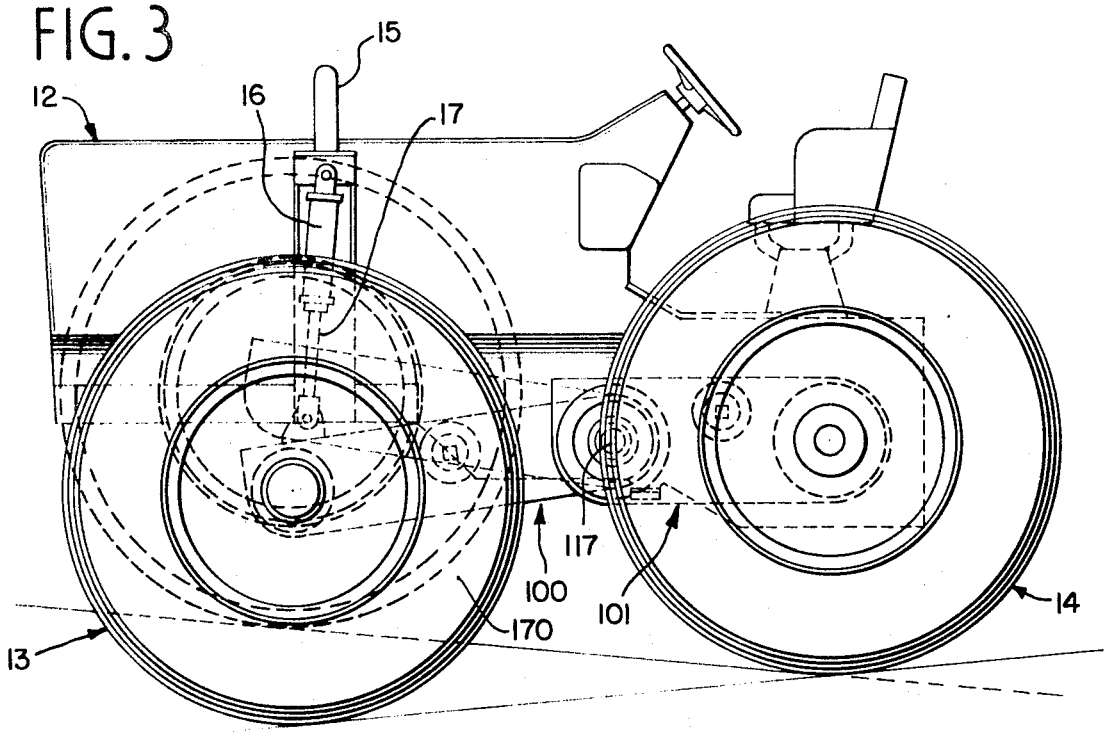

Vertical oscillating cylinders 16 permit the operator of the tractor to raise or lower the back end of the tractor with various equipment attached to it and thus change the center of gravity of the machine as shown in FIG. 2. This allows more weight to be placed on the rear axle for greater traction of the rear wheels. FIG. 3 shows an additional function of these cylinders. The cylinders keep both front wheels on the ground at all times. This hydraulic system is a closed balanced entity that permits one wheel to ride higher or lower than the other, by the action of the cylinder piston rod 17 being extended or depressed in the cylinder thereby enabling all four wheels to touch the ground. This is necessary to retain the traction required to obtain full benefit from the four-wheel drive.

Figure 4:
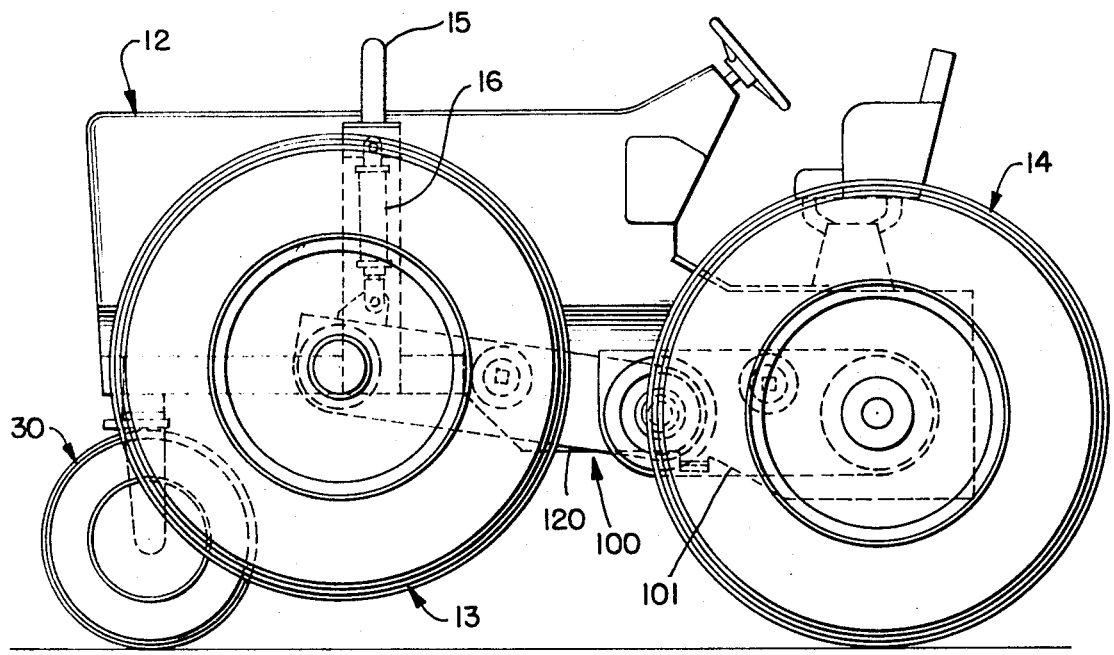
FIG. 4 illustrates the use of the original front tractor wheels in conjunction with the beam assembly.

FIG. 4 illustrates the third function of the vertical oscillating cylinders. These cylinders raise the beam front assembly 120 up alongside the tractor body 12, thus raising both new front wheels 13 off the ground and allowing the operator to use the manufacturers original steering system and front wheels 30. The original tractor wheel mountings allow for adjusting the width of all four wheels and this feature has been maintained in this design. One tractor which allows for this adjustment is manufactured by the International Harvester Company.

Figure 5:
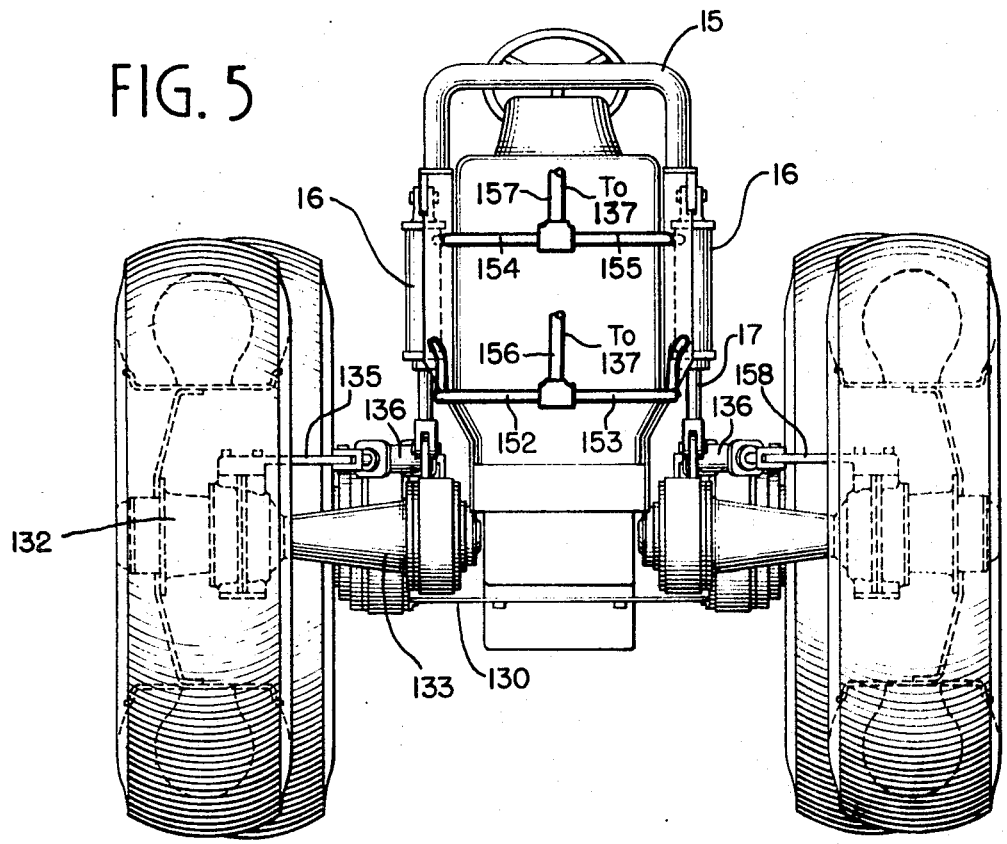
FIG. 5 shows a front elevation of the apparatus shown in FIG. 1, including the hydraulic fluid system for the vertical oscillators.

FIG. 5, showing a front view of the tractor, more clearly depicts the hydraulic front steering cylinders 136, as well as the vertical oscillating cylinders 16.

FIG. 6, an overhead view of the tractor, shown the capability of hydraulic steering; as well as the hydraulic steering system, which will be more clearly explained below.

Referring now to FIG. 7 and FIG. 8 which more clearly illustrate the beam assembly 100 comprising a front section 120 and a rear section 101. The rear beam assembly 101 comprises a housing 103 containing a rear wheel drive sprocket 105, affixed to a rotating bell housing 107 that is connected to the transmission-differential of the tractor. Referring to FIG. 13, which shows the rear rotating bell housing 107 in detail, there is shown a bearing and seal housing 109, a tapered locking bushing 108, an oil seal 111, a leaded bronze bearing 110, and a gasket 112 connected to mounting plate 113. Returning now to FIG. 7, rear drive chain 106 is connected to rear wheel drive sprocket 105 and the pivot sprocket 116 which encircles the pivot shaft 117. FIG. 11 illustrates this connection in detail showing a first pivot sprocket 116 and a second pivot sprocket 124 adjacent to each other. Sprocket 124 is connected to the front wheel sprocket 128 by chain 127. Center sprockets 116 and 124 as shown in FIG. 11 form an integral unit which transmits the power from the rear transmission axle 159 to the front wheels, through continuous chains 106 and 127. Eccentric idler shaft 115 around which is sprocket 114 forms the last portion of rear beam assembly 101 and is used to maintain the tension in drive chain 106.

Front beam assembly 120 is very similar to the rear beam and comprises a housing 122, the pivot sprocket 124 referred to above, a front wheel sprocket 128 which is attached to front axle 134, as well as a second idler sprocket 114 and a second eccentric idler shaft 115. The front wheel sprocket is enclosed in a housing 132 shown in FIG. 9. A front steering cylinder 136 is attached to the front beam frame assembly as is a piston rod 17 which is part of vertical oscillating cylinder 16. Front drive chain 127 is then connected around front drive sprocket 128 and the pivot sprocket 124. A double row of ball bearings 125 is used to aid in rotation of the pivot unit (FIG. 11). Front-driven sprocket 128 also has two ball bearings 129 shown in FIG. 9 to aid in rotation.

Figure 9:
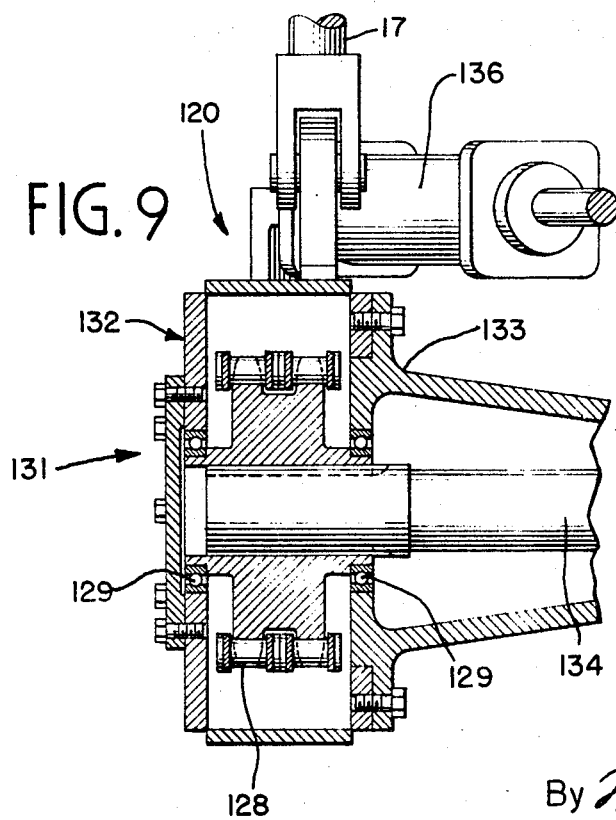
FIG. 9 is an enlarged view showing the front wheel rotating housing taken on the line 9–9 of FIG. 7 looking in the direction of the arrows.
Figure 10:
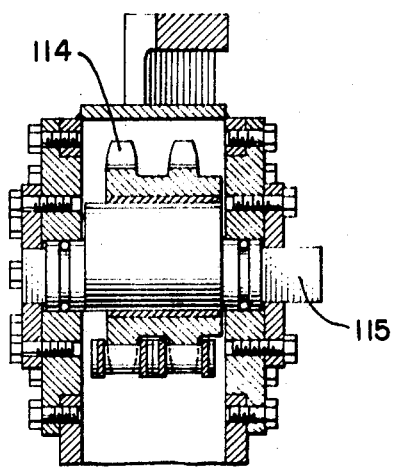
FIG. 10 illustrates an enlarged view of the idler sprocket housing taken on the line 10–10 of FIG. 7 looking in the direction of the arrows.

Referring now in more detail to the front end assembly, FIG. 9 shows the steering end assembly 131 consisting of the housing 132, a drive shaft housing 133, a drive shaft 134, and a steering arm 135. On the left side of the tractor there would be an equivalent steering arm 158 which corresponds to steering arm 135 on the right side and is identical except that it is a mirror image. The relative placement of the steering assembly is more clearly demonstrated with reference to FIGS. 5 and 6 which show housings 132 and 133 in the proper perspective with regard to the tractor body.

The hydraulic steering system is clearly shown in FIG. 6, and consists of hydraulic steering cylinders 136 and the accessories consisting of steering selector valve 137, hydraulic fluid tank 138, open port valve 139, and hydraulic hoses 140–147. The operation of this system will be more clearly explained below. The hydraulic system for oscillating cylinder 16 is shown in FIG. 5 and consists of the cylinders 16 and hydraulic hoses 152–157 which connect to hydraulic selection valve 137 shown in FIG. 6. The operation of the hydraulics is conventional and is merely controlled by opening and closing valve 137 to permit fluid to enter or leave the cylinders.

The operation of the front and rear beam assemblies will now be explained when considered in conjunction with FIGS. 5–13. To install the beam assemblies 100 to the tractor, the original rear wheels of the tractor are removed and the beam assemblies are placed along each side of the tractor body as in FIG. 6. The assemblies are fastened to the tractor frame 12 by utilizing mounting plates 113 of the rear beam housing 103 in conjunction with sealing gaskets 112 and tapered mounted bushings 108 which are tightly locked on the rear wheel transmission axles. The beam assemblies are then further secured to the tractor frame 12 by bolting the mounting bracket 130 to the beams and the underside of the tractor. The rear wheels are then remounted on the rear wheel transmission-differential axle 159.

The rotation of the transmission-differential axle 159 furnishes the drive power for the beam assemblies, the power being transmitted to the rear sprocket 105 through the tapered locking bushings 108, the rotating bell housings 107, and the drive sprockets 105 which are fixed to the bell housings. The row of chains 106 which are assembled on the sprockets, ride under the idler sprockets 114 which eliminates the slack in the chain and drive the driven sprockets 116. The driven sprockets 116 are fastened to and rotate the pivot shaft 117 thus turning the beam front assemblies driving sprockets 124 which are also fastened to the pivot shaft and transferring power into the forward half of the beam 120. The roller chains 127 ride under the idler sprockets and drive the driven sprockets 128 which in turn rotate the front wheels. The sprocket ratios of both front beam assemblies are 1:1 so that the front wheels turn the same number of revolutions as the rear wheels. This terminates the power transmission system.

The steering operation controlled through the hydraulic steering cylinders 136 attached to the front assembly. With the front wheels set parallel to the centerline of the tractor, the steering cylinder piston rods are set at half stroke and are attached to steering arms 135 and 158 of the steering end assembly 131. This can be clearly seen in FIG. 6. The steering selection valve 137 controls the flow of the hydraulic fluid to the steering cylinders and by extending or depressing the piston rods, the tractor will be directed left or right through the steering arms, turning the steering end assembly 131 through an arc of 25° on both sides of a neutral position.

For proper operations, hydraulic steering cylinders 136 must be bled to remove all of the air from the system and this is accomplished by opening the open port valve 139 in the hydraulic fluid tank 138. After making sure that it is emersed in the hydraulic fluid, and with the front wheels free of the ground oscillating them against the piston rods, extending and depressing the rods to their maximum, driving all the air out through the open port of the valve. The wheels are realigned parallel to the center of the tractor and the valve is closed. This system is now secured and operable. Steering selector valve 137 is also used to select between the original steering system as furnished on the tractor by the manufacturer, and the new steering system shown in FIG. 6. This valve is an integral part of both systems and with it the operator will be able to select either system as required for any particular application.

The last facet of this new conversion design is the dual capabilities associated with the oscillating cylinders 16 which are mounted on the front end of the tractor. These cylinders are normally set at half piston stroke and are also hydraulically operated. The primary purpose of these cylinders is to keep the two front wheels always in contact with the terrain over which the tractor is moving, within the limit of the stroke of the piston rod. The secondary purpose of these cylinders is to raise or lower the front or back of the tractor. The source of the hydraulic fluid necessary for operating the steering cylinder and oscillating cylinder systems described above comes from the hydraulic system that is furnished with the tractor. Activation of these cylinders is again controlled by selector valve 137.

While the beam assembly 100, having component parts 101 and 120, have been described singularly, it is to be understood that there is both a left-hand member and a right-hand member as shown in FIG. 6. There are two front-wheel-steering assemblies, one of which is shown in FIG. 9, two front idler assemblies shown in FIG. 10, two center pivot sprockets shown in FIG. 11, two rear idler assemblies shown in FIG. 12, and two rear wheel drive sprocket assemblies shown in FIG. 13. By modifying the original tractor in this manner, a new and improved device is obtained which can serve as a singular logging machine which accomplishes sheering of the limbs, delimbing, skidding, and bucking all in one power unit. This is achieved because of the unique capabilities of four-wheel drive and independent front suspension, which heretofore has not been present.

Figure 14:
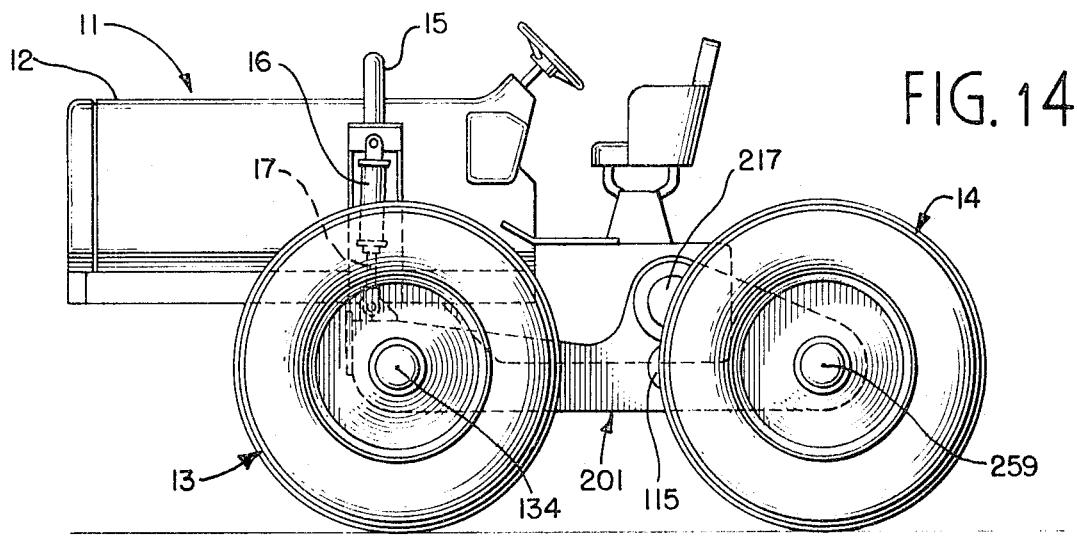
FIGS. 14–16 show a second preferred embodiment utilizing a unitary frame section walking beam assembly that correspond to FIGS. 1–3 respectively.
Figure 15:
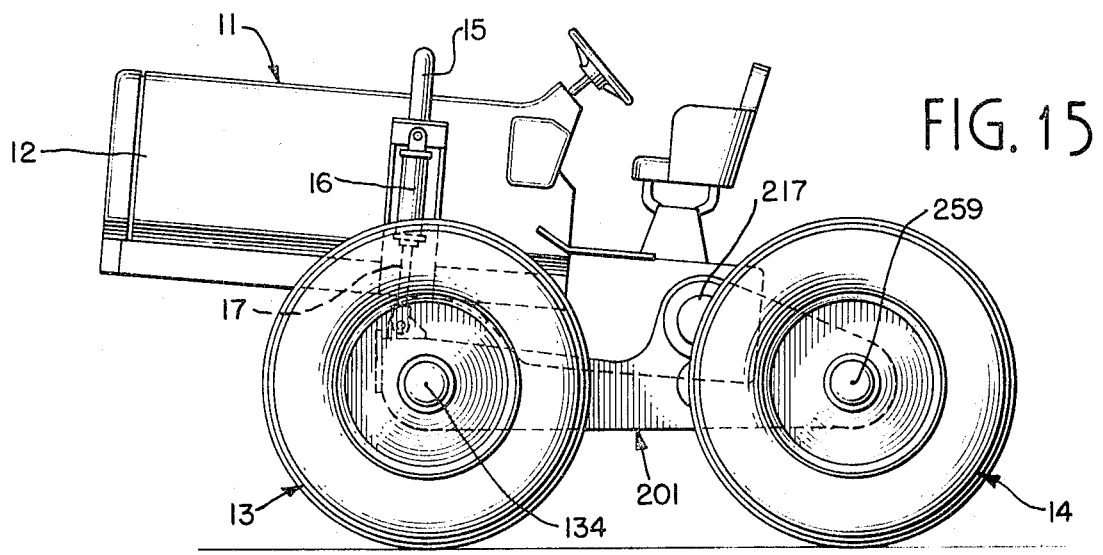
Figure 16:
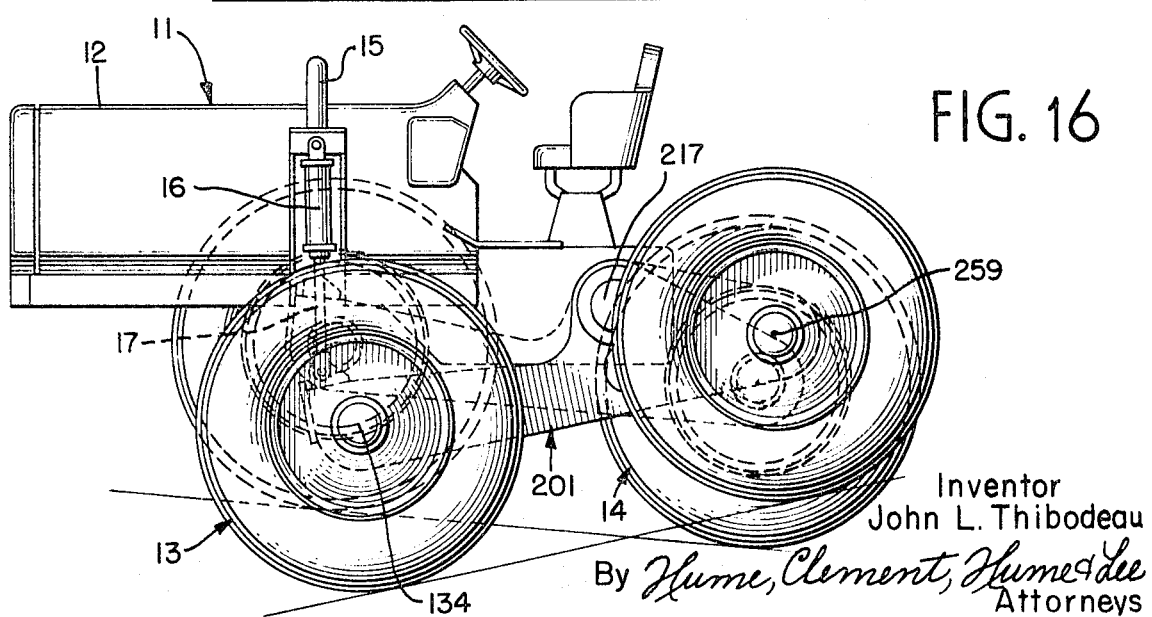

FIGS. 14 through 25 disclose a second alternative embodiment of the above invention, utilizing a walking beam assembly 201 having a unitary one-section frame 203 utilizing a single walking beam wherein the front and rear wheels are attached to the same frame 203. This allows for four-wheel steering as well as four-wheel drive. However, the feature in the first embodiment allowing for the interchangeable use of the original tractor front wheels is no longer present in this embodiment and thus, for clarity, the walking beam assembly is depicted as being attached to a tractor body or frame 11. Referring now to the drawings, wherein like reference characters designate like or corresponding parts, there is shown in FIG. 14 a tractor utilizing a walking beam assembly 201 having a unitary frame 203. FIG. 14 corresponds to FIG. 1 while FIG. 15 and 16 correspond to FIGS. 2 and 3 respectively, and show the feature of raising the tractor frame to change the center of gravity as well as having all four wheels independently steered.

FIG. 17 is similar to FIG. 5 but for clarity does not show the hydraulic lines for controlling the vertical oscillating cylinders 16. It is to be understood, however, that the hydraulic system for these cylinders is identical to that shown in FIG. 5 and described with regard to the first embodiment. FIG. 18 shows the walking beam assembly 201 positioned on either side of the tractor frame and clearly shows the four-wheel steering as accomplished by hydraulic cylinders 136 in the front and hydraulic cylinders 236 in the rear. Hydraulic cylinders 236 are connected to the walking beam assembly as shown in FIG. 23. The hydraulic control for these cylinders is shown in FIG. 25, the operation of which will be explained below.

FIG. 19 and FIG. 20 show an enlarged view of the walking beam assembly. The parts which are identical to the embodiment shown in FIG. 6 and are numbered identically. One can obviously see that the operation of this embodiment is similar to the first embodiment. The assembly comprises a front wheel axle 134 having a driven sprocket 128 and a rear wheel axle 259 having a driven sprocket 205. The detailed construction of these assemblies is shown in FIG. 21 and 24 respectively. The front assembly is identical in operation and construction to the front wheel steering assembly of the first embodiment shown in FIG. 9 while the rear wheel assembly in this second embodiment is identical to the front assembly, and therefore no further explanation as to their operation is deemed necessary. Both the front and rear wheels are capable of being steered with this arrangement. The major difference between the one-piece and two-piece walking beam construction lies in the power transmission axle 217 shown in FIG. 22. In the first embodiment, the original transmission-differential was connected directly to the rear wheel axle. The rear wheels in turn drove a pivot axle which in turn drove the front wheels. In the second embodiment, the transmission-differential is not connected to the rear wheels but is connected to an intermediate axle 217 having a sprocket 216, which drives a chain 206. Chain drive 206 then in turn drives front wheel sprocket 128 and rear wheel sprocket 205. Eccentric axle 115 and associated sprocket 114 maintain tension on the chain. Therefore it can be clearly seen that while the walking beam is attached in a slightly different position, the principle remains the same. A moving chain 206 drives all four wheels. Because the rear wheels in this embodiment are not mounted on the drive axis, they are capable of being hydraulically steered by hydraulic cylinders 236.

Referring now to FIG. 25, which shows the entire hydraulic steering assembly utilized in this second embodiment, four hydraulic cylinders 136 and 236 controlling respectively the front and rear wheels, are shown. The hydraulic pump 263 and the hydraulic tank 238, supplied as part of the original tractor, are in fluid communication with each other through tube 245. The control valve 237, connected to the pump 263 by tube 246 and to the tank 238 by tube 248, controls the flow of fluid from the pump to the hydraulic cylinders 136 and 236 and from the cylinders to the tank 238 by means of tubes 240–243, 247, and 263–266 and open port valves 260, 261, and 262. The fluid motion through the tubes is shown in the direction of the arrows, the arrows showing the direction of the fluid when the machine is making a left-hand turn. Reverse arrows are used for a right-hand turn. One critical feature in utilizing four-wheel steering is the alignment of the steering cylinders. In order to align the cylinders the following procedures must be utilized. First, ascertain that all the valves are emersed in hydraulic fluid in the tank and then open all the valves with the wheels free of the ground, oscillating each wheel against its hydraulic cylinder rod. This causes first an extension of the rod to maximum stroke and then a depression of the rod to minimum stroke; thus, forcing all air from the cylinder through the open valve. The four wheels are then aligned with the chalk line or straight edge parallel to the centerline of the machine and the valves are closed. With this, the hydraulic system is now operable. By utilizing a conventional steering wheel, the tractor can now be controlled with a four-wheel drive and four-wheel steering. It will be recognized by one skilled in the art that while each of the preferred embodiments utilize a hydraulic steering system and a hydraulic suspension system, any other type of power steering and/or suspension system may be utilized such as an air suspension system and/or an air steering system. It is to be understood that although certain features of the second embodiment have not been explained these operate in a similar manner as described above with reference to the first embodiment. It should be further understood, of course, that the foregoing disclosure relates only to two preferred embodiments of the invention and that numerous modifications or alterations may be made therein without departing from the spirit and the scope of the invention as set forth in the appended claims.

What is claimed is:

1. A conversion unit for replacing all wheels of a conventional two wheel drive tractor to convert said conventional tractor to a four-wheel drive and four-wheel steered tractor and wherein said conventional tractor comprises a longitudinally extending body supporting a power unit connected to a single transmission-differential axle unit having drive axles extending laterally on each side of said body and said drive axles including drive means for normally driving the wheels of said conventional two wheel tractor, said conversion unit comprising:

a unitary walking beam frame assembly mounted on each side of said tractor body frame, each of said walking beam frame assemblies being pivotably mounted intermediate its ends on said drive axles for independent pivotal movement relative to each other and relative to said body;

a front-wheel-mounting means mounted to each of said walking beam frame assemblies;

a rear-wheel-mounting means mounted to each of said walking beam frame assemblies;

a single endless drive means in each of said walking beam frame assemblies and connected to said drive means to said front-wheel-mounting means and to said rear-wheel-mounting means for transmitting movement thereto;

means for connecting a wheel to each of said wheel-mounting means, said connecting means including pivot means providing for pivotal movement of each said wheel about a substantially vertical axis relative to said walking beam frame assembly;

hydraulic suspension means connected to each said walking beam frame assembly and said tractor body for pivoting said walking beam frame assemblies about said drive axles whereby said wheels maintain contact with the ground;

hydraulic actuator means connected to each of said connecting means and the corresponding walking beam frame assembly whereby said actuator means pivots said wheels about said pivot means; and manually actuated means connected to said actuator means for simultaneously energizing said actuator means whereby said tractor is provided with four-wheel drive and four-wheel steering.

2. The conversion unit of claim 1 wherein said drive means comprises a continuous chain.

3. The conversion unit of claim 1 further comprising an idler means mounted on each of said walking beam frame assemblies whereby said idler means is adapted to maintain tension in said endless drive means.

* * * * *

UNITED STATES PATENT OFFICE
CERTIFICATE OF CORRECTION

Patent No. 3,620,321  Dated November 16, 1971

Inventor(s) John L. Thibodeau

It is certified that error appears in the above-identified patent and that said Letters Patent are hereby corrected as shown below:

Column 1, line 57, "released" should read -- raised --. Column 2, line 63, "FIG. 19" should be indented. Column 4, line 10, "shown" should read -- shows --. Column 8, line 22, after "means", first occurrence, insert -- to be driven therefrom --.

Signed and sealed this 14th day of November 1972.

(SEAL)
Attest:

EDWARD M. FLETCHER, JR.
Attesting Officer

ROBERT GOTTSCHALK
Commissioner of Patents